United States Patent Office 3,173,434
Patented Mar. 16, 1965

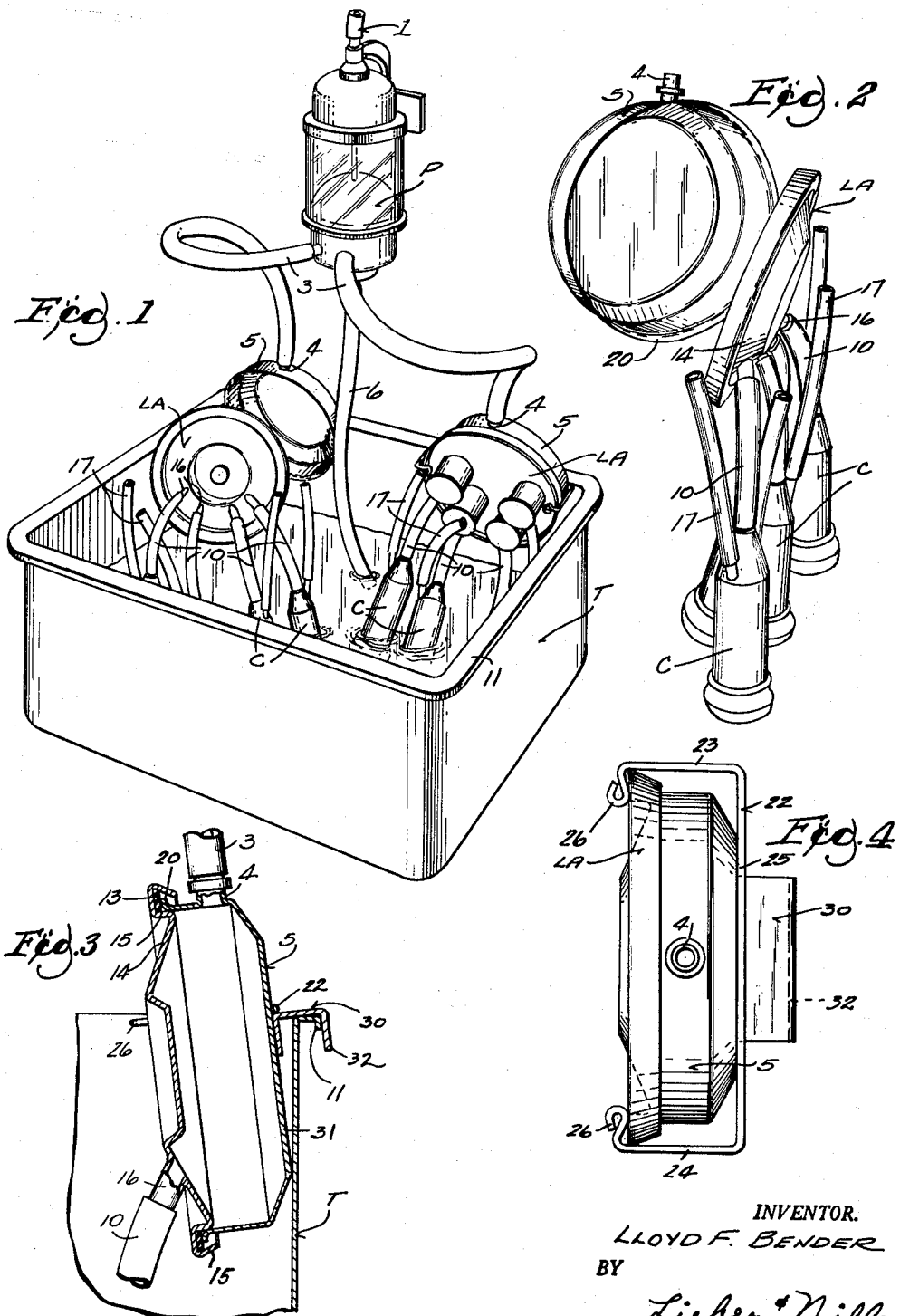

3,173,434
MILKER LIDS CLEANING APPARATUS
Lloyd F. Bender, Rte. 2, Hayward, Wis.
Filed Jan. 14, 1963, Ser. No. 251,301
4 Claims. (Cl. 134—169)

This invention relates generally to milking equipment and more particularly to apparatus for cleaning milker lids and their associated teat cups which are connected thereto by flexible conduits.

Milking equipment of this character must be thoroughly cleaned after each use and is subject to strict sanitary laws relating to their use and cleaning.

In view of the nature of these milker lids which have a number of flexible conduits and nozzles, it has been a time consuming task to completely disassemble these lids for complete cleaning.

Accordingly, the present invention provides cleaning apparatus which permits the entire milker lid assembly, including the conduits and teat cups, to be completely cleaned as a unit and without disassembly. A more specific aspect of the invention relates to an adapter pan to which the milker lid assembly may be quickly attached as a unit and suspended from it in such a manner that the flexible conduits will not close or shut off during the cleaning operation; a self-locking pressure bail is provided for the pan for permitting the completed lid assembly to be easily and quickly attached to or detached from the pan and held securely thereon during the cleaning operation; the improved pan has a particular lip around its open edge whereby not only good sealing with the milker lid gasket is assured but it also holds the lid on the pan during assembly so that one hand of the operators is free to apply the locking pressure bail; furthermore the improved pan has a cleaning fluid inlet nipple located at its top side to insure complete pulsation of the fluid through the milker lid assembly.

These and other objects and advantages of the present invention will appear hereinafter as this disclosure progresses, reference being had to the accompanying drawings, in which:

FIGURE 1 is a perspective view of a plurality of milker lid assemblies, one as being installed on its respective adaptor pan which embodies the present invention, the units being shown in a washing tank;

FIGURE 2 is a perspective view of a conventional milk lid assembly, and an adaptor pan made in accordance with the present invention;

FIGURE 3 is a vertical cross sectional view through a milking lid as applied to a pan made in accordance with the present invention, the assembled unit shown as suspended in a forwardly tilted direction during the cleaning operation in a cleaning tank, and FIGURE 4 is a plan view of an adaptor pan as attached to the milking lid.

Referring in greater detail to the drawings, the general cleaning operation uses a conventional pulsating pump P that operates by a conduit 1 connected to a conventional vacuum system (not shown). The pump, per se, is conventional and may be of the type shown in my U.S. Patent No. 2,829,657, issued on April 8, 1958. A plurality of flexible conduits 3 extend from the pump and are attached to their respective nozzle 4 at the top side of an adaptor pan 5. A large tank T contains the cleaning solution which is forced by the pump P to pulsate through the conduits 3, the pans 5 and the milker lid assembly LA which are sealingly attached to their respective pan 5, as will appear more fully. Another conduit 6 extends downwardly from the pump and into the tank and serves to continually by-pass a certain amount of solution back to the tank from the pump, thus assuring circulation of the solution as well as continuous pulsation of the solution in the parts being cleaned.

The tank T should be of a size to accommodate the desired number of lids to be cleaned at one time, depending on the number of pumps themselves being used. On the other hand, the tank should not be unnecessarily large to require an excessive amount of solution. The tank is sufficiently deep to permit the teat cups C and their associated flexible conduits 10 to hang freely downwardly in the tank. A peripheral flange 11 extends outwardly around the upper edge of the tank.

The milker lid assemblies LA themselves are conventional and have a gasket 13 around the lower side of the lid 14 for sealing engagement with a milk can (not shown). The lid 14 has an inwardly inclined and generally axially extending flange 15 around its periphery. These assemblies also comprise the four flexible conduits 10 extending from the lid and which are detachably secured thereto by being slipped over their respective hollow nipples 16 which extend from the lid. At the free end of each conduit is the tea cup C. Air breather tubes 17 extend freely from each cup.

In FIGURE 1, two different styles of milk lid assemblies are shown but the general organization is the same for purposes of this disclosure. In any event, it has heretofore been necessary to clean these assemblies, to remove each of the conduits 10 from their lid in order to properly clean the various parts.

The adaptor pan provided by the present invention is of such shape and depth that it can accommodate lid assemblies of various types. This pan has a lip 20 extending generally radially around the outer peripheral edge of the pan, and acts to seal against the gasket 13 of the lid. This lip is inserted within the flange 15 and holds the lid centered on the pan, which permits the operator to apply and snap a locking bail 22 in place for securely holding the lid assembly in sealed engagement with the pan.

The bail 22 is of general U-shape having side legs 23 and 24 and a bight portion 25. At each free end of the legs is an inwardly turned arm 26, which arms extend over and bear agains the outside of the lid, resiliently holding it against the pan. The self-locking bail is easily installed on or removed from the assembled unit.

The assembled lid and pan are held in a forwardly inclined position, as shown in FIGURE 3, by a bracket 30 which is welded across the flat bottom 31 of the pan and has a downwardly turned edge 32 which fits over the flange of the tank. The entire pan assembly can thus be easily hung in place on the tank, in an inclined position to insure that the conduits are not bent closed but instead hang freely to insure passage of the cleaning solution therethrough. The flat bottom 31 of the pan bears against the tank to stabilize the suspended assembly. During the cleaning operation, the pump P causes the solution to be sucked up from the tank, into the cups C, conduits 10, pans 5, conduits 3, and into the pump. The solution is then pulsated back and forth through these parts, thoroughly cleaning them.

When the cleaning cycle is over, the bail 22 is simply sprung open and the clean lid assembly removed.

Various modes of carrying out the invention are contemplated as being within the scope of the following claims particularly pointing out and distinctly claiming the subject matter which is regarded as the invention:

I claim:
1. Cleaning apparatus for milk lid assemblies comprising a circular lid with a sealing gasket on one side and a plurality of flexible conduits extending from the other side, said apparatus comprising, a circular pan having an open upper end, a peripheral lip around said open upper end and sealingly engageable with said gasket to thereby place said conduits in communication with the interior of said pan, means for releasably holding said lid on said pan, said pan also having a generally flat bottom and a bracket secured to the outside of said bottom for suspending said pan in a generally vertical position with said upper end inclined downwardly, and a cleaning solution nipple at the top and on the periphery of said pan when so suspended and in communication with the interior of said pan.

2. Cleaning apparatus for milk lid assemblies comprising a circular lid with a sealing gasket on one side and a plurality of flexible conduits extending from the other side, said apparatus comprising a circular pan having an open upper end, a peripheral lip around said open upper end and sealingly engageable with said gasket to thereby place said conduits in communication with the interior of said pan, said pan also having a generally flat bottom and a bracket secured to the outside of said bottom for suspending said pan in a generally vertical position with said upper end inclined downwardly to thereby permit said flexible conduits to hang freely, and a cleaning solution nipple at the top and on the periphery of said pan when said pan is in said hanging position and in communication with the interior of said pan; and a generally U-shaped bail removably embracing said pan and having opposite arms extending at least partially across said open end for yieldingly engaging opposite sides of said lid and holding it in sealing engagement with said pan.

3. Cleaning apparatus for a milk lid assembly comprising, a circular pan having an open upper end, a peripheral lip around said open upper end and for sealing engagement with said assembly, said pan also having a generally flat bottom and a mounting bracket secured to the outside of said bottom for hangingly suspending said pan in an upright position with said upper end inclined downwardly, and a cleaning solution nipple at the top of said pan and on the periphery thereof and in communication with the interior of said pan.

4. Cleaning apparatus for a milk lid assembly comprising, a circular pan having an open upper end, a peripheral lip around said open upper end and for sealing engagement with said assembly, said pan also having a generally flat bottom and a mounting bracket on the outside of said bottom for hangingly suspending said pan in an upright position with said upper end inclined downwardly, a cleaning solution nipple at the top of said pan and on the periphery thereof and in communication with the interior of said pan, and a bail removably embracing said pan and having a pair of oppositely disposed arms extending at least partially across opposite sides of said open end for yieldingly engaging said lid and holding it in sealing engagement with said pan.

References Cited by the Examiner

UNITED STATES PATENTS

| | | | |
|---|---|---|---|
| 768,364 | 8/04 | Hines | 220—18 X |
| 1,051,651 | 1/13 | Tunnessen | 220—18 X |
| 2,085,493 | 6/37 | Evitt | 292—258 |
| 2,135,225 | 11/38 | Sladky | 292—258 |
| 2,233,852 | 3/41 | Schmitt | 134—169 |
| 2,650,179 | 9/53 | Anderson | 134—22 |
| 2,702,767 | 2/55 | Domingo | 134—169 X |
| 2,956,571 | 10/60 | Heisler | 134—169 |

CHARLES A. WILLMUTH, *Primary Examiner.*

GEORGE J. NORTH, *Examiner.*